(12) United States Patent
Tian

(10) Patent No.: US 10,609,538 B2
(45) Date of Patent: Mar. 31, 2020

(54) METHOD AND DEVICE FOR IDENTIFYING BLUETOOTH HEADSET VOICE SOURCE

(71) Applicants: Shenzhen Timekettle Technologies Co., Ltd., Shenzhen, Guangdong (CN); Li Tian, Shenzhen, Guangdong (CN)

(72) Inventor: Li Tian, Guangdong (CN)

(73) Assignees: Shenzhen Timekettle Technologies Co., Ltd., Shenzhen, Guangdong (CN); Li Tian, Shenzhen, Guangdong (CN)

( * ) Notice: Subject to any disclaimer, the term of this patent is extended or adjusted under 35 U.S.C. 154(b) by 0 days.

(21) Appl. No.: 16/548,811

(22) Filed: Aug. 22, 2019

(65) Prior Publication Data

US 2019/0380018 A1  Dec. 12, 2019

Related U.S. Application Data

(63) Continuation of application No. PCT/CN2017/077563, filed on Mar. 21, 2017.

(30) Foreign Application Priority Data

Feb. 24, 2017 (CN) .......................... 2017 1 0103385

(51) Int. Cl.
*H04W 4/80* (2018.01)
*H04W 76/11* (2018.01)
(Continued)

(52) U.S. Cl.
CPC ............ *H04W 4/80* (2018.02); *G06F 21/445* (2013.01); *H04M 1/6066* (2013.01);
(Continued)

(58) Field of Classification Search
CPC ... H04W 4/80; H04M 1/6066; H04M 1/7253; H04M 2250/02; H04M 1/6041; H04M 1/6058; H04M 1/72527
See application file for complete search history.

(56) References Cited

U.S. PATENT DOCUMENTS

| | | |
|---|---|---|
| 2014/0172238 A1 | 6/2014 | Craine |
| 2016/0080896 A1 | 3/2016 | Song |
| 2019/0182878 A1* | 6/2019 | Huang ................ H04M 1/7253 |

FOREIGN PATENT DOCUMENTS

| | | |
|---|---|---|
| CN | 103391118 | 11/2013 |
| CN | 103561479 | 2/2014 |

(Continued)

*Primary Examiner* — Nam T Huynh
(74) *Attorney, Agent, or Firm* — Winston Hsu

(57) ABSTRACT

A method for identifying a Bluetooth headset voice source includes: S1: establishing a connection between a device itself, that is, a first Bluetooth headset, and a smart terminal and a connection between the first Bluetooth headset and a second Bluetooth headset separately; and S2: when the first or second Bluetooth headset sends a voice, establishing a data control channel by using Generic Attribute Profile and Attribute Protocol, sending a corresponding identifier to the smart terminal according to different voice sources, and then sending the voice to the smart terminal. A device for identifying a Bluetooth headset voice source includes a baseband circuit (1), a memory (2), and a main controller (3). The program in the memory (2) is used for performing the method for identifying a Bluetooth headset voice source. The method and device can solve the problem about identifying voice sources of two Bluetooth headsets.

10 Claims, 4 Drawing Sheets

S1
Establish a connection with a smart terminal and a second Bluetooth headset separately S2
Establish a data control channel by using Generic Attribute Profile and Attribute Protocol, send a corresponding identifier to the smart terminal according to different voice sources, and then send the voice

(51) Int. Cl.
*G06F 21/44* (2013.01)
*H04M 1/60* (2006.01)
*H04M 1/725* (2006.01)

(52) U.S. Cl.
CPC ....... *H04M 1/72505* (2013.01); *H04W 76/11* (2018.02); *H04M 2250/02* (2013.01)

(56) References Cited

FOREIGN PATENT DOCUMENTS

| | | |
|---|---|---|
| CN | 103636141 | 3/2014 |
| CN | 103686516 | 3/2014 |
| CN | 103986503 | 8/2014 |
| CN | 104301011 | 1/2015 |
| CN | 105101058 | 11/2015 |
| CN | 105993136 | 10/2016 |

\* cited by examiner

METHOD AND DEVICE FOR IDENTIFYING BLUETOOTH HEADSET VOICE SOURCE

CROSS REFERENCE TO RELATED APPLICATIONS

This application is a continuation application of PCT/CN 2017/077563, filed on Mar. 21, 2017, which claim the priority to Chinese Patent Application No. 201710103385.8, filed on Feb. 24, 2017, entitled "METHOD AND DEVICE FOR IDENTIFYING BLUETOOTH HEADSET VOICE SOURCE". The contents of all of the above are all hereby incorporated by reference.

BACKGROUND OF THE INVENTION

1. Field of the Invention

The present application relates to the field of Bluetooth transmission, and more particularly to a method and device for identifying a Bluetooth headset voice source.

2. Description of the Prior Art

Bluetooth technology is an open standard for wireless data and voice communication and is now widely used in various mobile smart terminals including wearable devices. Bluetooth technology has evolved from the early version 1.0 to the version 4.0. It has the advantages of low power consumption and wide transmission range, and can penetrate different substances and spread between substances. By adopting the frequency-hopping spread spectrum technology, Bluetooth technology has strong anti-interference ability and is not susceptible to eavesdropping. It uses the frequency spectrum unrestricted in all countries.

In the existing technologies, although the mobile terminal can be connected with multiple Bluetooth devices, when transmitting voice data, only one of the Bluetooth devices can be connected to perform one-to-one voice transmission. In some studies, although the voice sent by the mobile terminal can be shared by two Bluetooth headsets, the voice is not played only by the designated Bluetooth headset. In particular, when two Bluetooth headsets simultaneously send voice to the mobile terminal, the smart terminal cannot identify which Bluetooth headset the voice data is from, and thus cannot effectively process the information.

SUMMARY OF THE INVENTION

The present application is directed to a method and device for identifying a Bluetooth headset voice source, aiming at solving the problem that the smart terminal cannot identify a Bluetooth headset voice source.

In one aspect, the present application provides a method for identifying a Bluetooth headset voice source, the method including the following steps:

S1: establishing a connection between a device itself, that is, a first Bluetooth headset, and a smart terminal and a connection between the first Bluetooth headset and a second Bluetooth headset separately; and S2: when the first or second Bluetooth headset sends a voice, establishing a data control channel by using Generic Attribute Profile and Attribute Protocol, sending a corresponding identifier to the smart terminal according to different voice sources, and then sending the voice to the smart terminal.

Further, the step S2 further includes the following sub-steps:

S21: generating a first voice by the device itself, or receiving a second voice sent by the second Bluetooth headset;

S22: determining whether the voice is generated by the device itself; if not, executing S23; if yes, sending a first identifier representing the first Bluetooth headset to the smart terminal, then sending the first voice to the smart terminal, and ending; and S23: sending a second identifier representing the second Bluetooth headset to the smart terminal, and then sending the second voice to the smart terminal.

Further, when the first or second Bluetooth headset receives a voice from the smart terminal, the method further includes the following steps:

S3: enabling the device itself, that is, the first Bluetooth headset, to receive an identifier sent by the smart terminal by using the data control channel, and then receive the voice sent by the smart terminal;

S4: determining whether the identifier is the first identifier representing the first Bluetooth headset; if not, executing S5; if yes, playing the voice directly; and S5: sending the voice to the second Bluetooth headset.

In another aspect, the present application provides a device for identifying a Bluetooth headset voice source, including a baseband circuit, a memory, and a main controller. The memory is configured to store a computer program and temporary voice data. The main controller is configured to execute the computer program. The baseband circuit is electrically connected to the main controller, and the memory is electrically connected to the main controller. The computer program enables the device to perform the above method.

In another aspect, the present application further provides a computer readable storage medium including a computer program, wherein the computer program is operable to enable a computer to perform the above method.

The present application has the following beneficial effects: a typical Bluetooth headset uses only the audio transport protocol for connection to transmit voice, and cannot and does not need to transmit data in other formats. However, according to the device for identifying a Bluetooth headset voice source provided by the present application, Generic Attribute Profile and Attribute Protocol are added based on the existing standard, the data control channel is established through Generic Attribute Profile and Attribute Protocol, the feature that UUID data of which rules are user-defined can be transmitted in the data control channel is utilized to transmit unique identifiers representing different headsets, and the voice is transmitted to the smart terminal, so that the smart terminal can identify the exact source of the voice.

These and other objectives of the present invention will no doubt become obvious to those of ordinary skill in the art after reading the following detailed description of the preferred embodiment that is illustrated in the various figures and drawings.

DETAILED DESCRIPTION

To make the objectives, technical solutions, and advantages of the present application more comprehensible, the following further describes the present application in detail with reference to the accompanying drawings and embodiments. It should be understood that the specific embodiments described herein are merely used to explain the present disclosure but are not intended to limit the present application.

Embodiment 1

Figure 1:
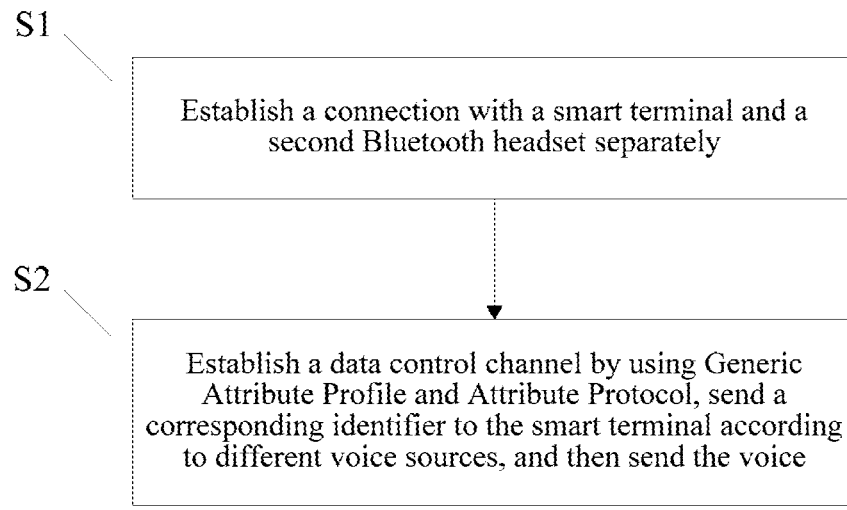
FIG. 1 is a flow chart of a method for identifying a Bluetooth headset voice source according to Embodiment 1 of the present application.

FIG. 1 is a flow chart of a method for identifying a Bluetooth headset voice source provided by the present application. For the convenience of description, only the parts related to the embodiment of the present application are shown, which are detailed as follows:

S1: Establish a connection between a device itself, that is, a first Bluetooth headset, and a smart terminal and a connection between the first Bluetooth headset and a second Bluetooth headset separately.

A connection is established between the first Bluetooth headset and the smart terminal through Hands-Free Profile, Generic Attribute Profile and Attribute Protocol, and a connection is established between the first Bluetooth headset and the second Bluetooth headset through Hands-Free Profile.

S2: When the first or second Bluetooth headset sends a voice, establish a data control channel by using Generic Attribute Profile and Attribute Protocol, send a corresponding identifier to the smart terminal according to different voice sources, and then send the voice to the smart terminal.

Figure 2:
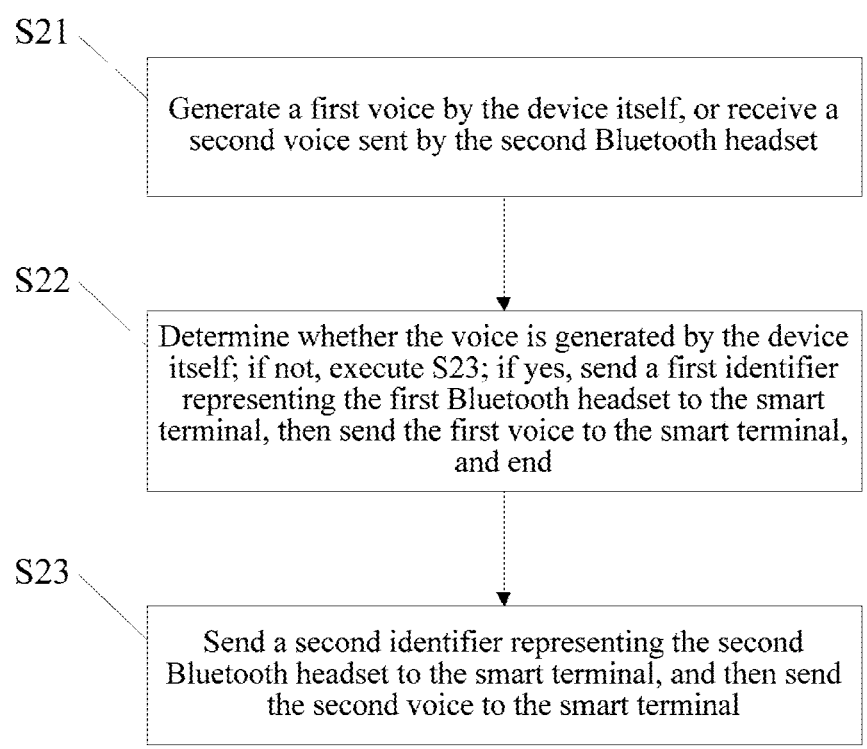
FIG. 2 is a sub-flow chart of step S2 in the method according to Embodiment 1 of the present application.

As shown in FIG. 2, step S2 further includes:

S21: Generate a first voice by the device itself, or receive a second voice sent by the second Bluetooth headset.

S22: Determine whether the voice is generated by the device itself; if not, execute S23; if yes, send a first identifier representing the first Bluetooth headset to the smart terminal, then send the first voice to the smart terminal, and end.

S23: Send a second identifier representing the second Bluetooth headset to the smart terminal, and then send the second voice to the smart terminal.

Figure 3:
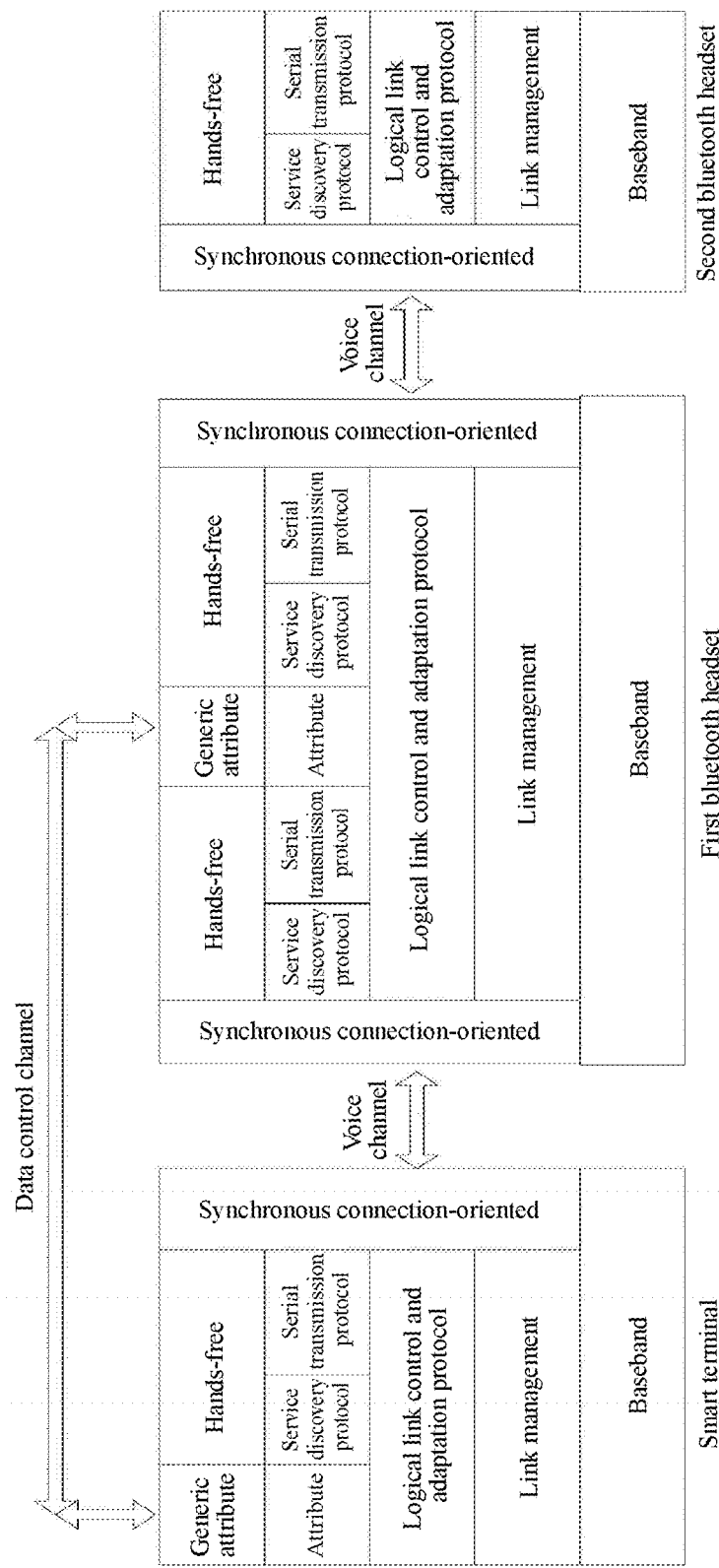
FIG. 3 is a schematic diagram of protocol design of a first Bluetooth headset in the method according to Embodiment 1 of the present application.

FIG. 3 is a schematic diagram of protocol design of the first Bluetooth headset in the method. A typical Bluetooth headset can only be passively connected and cannot be actively connected to other Bluetooth devices. In the present application, the first Bluetooth headset can be actively connected. Two sets of Bluetooth audio transport protocols are run on the same baseband. That is, the first Bluetooth headset implements the audio profile and Hands-Free Profile (HFP) of Bluetooth profiles, and at the same time acts as an HFP gateway (audio gateway), and thus, can be connected to two different Bluetooth devices and transmit the voice. The voice of the smart terminal is transmitted to the first Bluetooth headset, and the first Bluetooth headset can transmit the voice to the second Bluetooth headset. The voice of the second Bluetooth headset is sent back to the first Bluetooth headset through synchronous connection-oriented (SCO) links, and sent by the first Bluetooth headset back to the smart terminal through the SCO links.

In order to facilitate different target voice identifiers, Generic Attribute Profile (GATT) is added between the smart terminal and the first Bluetooth headset as a data control channel. The Attribute Protocol (ATT) acts as a basic protocol of Generic Attribute Profile, so that the first identifier and the second identifier respectively representing the first Bluetooth headset and the second Bluetooth headset can be transmitted in the data control channel. The identifier can be UUID data of which rules are user-defined, so that the smart terminal and the first Bluetooth headset comply with the rules, and can identify the UUID data from each other and acquire important information, such as a character string representing different Bluetooth devices. The control unit in the first Bluetooth headset can determine whether the voice is generated by the device itself, and whether the received identifier is an identifier representing the device itself. The smart terminal in the method can be a mobile smart device with a Bluetooth interface, such as a smart phone, a tablet computer, and a smart watch or bracelet.

Figure 4:
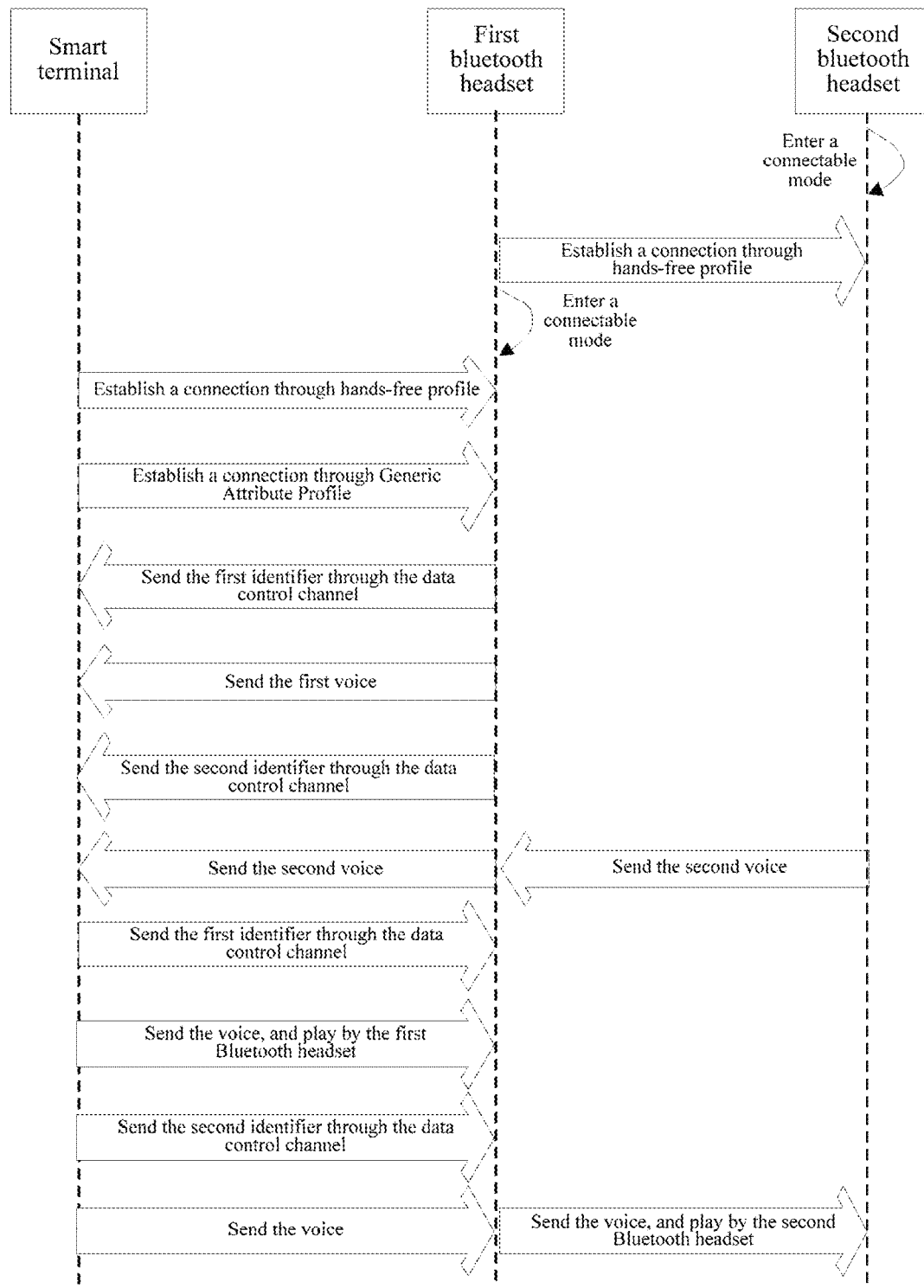
FIG. 4 is a sequence chart of the method for identifying a Bluetooth headset voice source according to Embodiment 1 of the present application.

Further optionally, the method further includes the part that the first and second Bluetooth headsets receive the voice of the smart terminal. As shown in FIG. 4, the method further includes the following steps:

S3: Enable the device itself, that is, the first Bluetooth headset, to receive the identifier sent by the smart terminal by using the data control channel, and then receive the voice sent by the smart terminal.

S4: Determine whether the identifier is the first identifier representing the first Bluetooth headset; if not, execute S5; if yes, play the voice directly.

S5: Send the voice to the second Bluetooth headset.

Therefore, the first Bluetooth headset mainly performs the function of voice forwarding and identifier determination in the whole process, and the voice data is temporarily stored in the first Bluetooth headset during forwarding. After the corresponding identifier is sent, the voice data is instantly sent to the smart terminal or the second Bluetooth headset.

Embodiment 2

Figure 5:
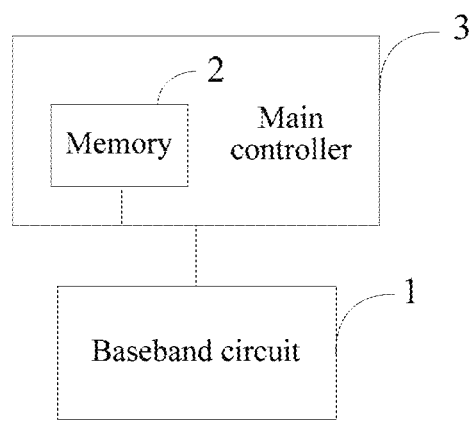
FIG. 5 is a structural block diagram of a device for identifying a Bluetooth headset voice source according to Embodiment 2 of the present application.

As shown in FIG. 5, the first Bluetooth headset includes a baseband circuit 1, a memory 2, and a main controller 3. The baseband circuit 1 corresponds to the protocol part of the baseband in FIG. 3, and is configured to complete the underlying processing of wireless signals, and transmit the processed digital signals to the upper layer system. The memory 2 is configured to store a computer program and temporary voice data. The computer program corresponds to and uses multiple protocols of the upper layer of the baseband in FIG. 3, including link management, logical link control and adaptation protocol, synchronous connection-oriented, service discovery protocol, serial transmission protocol, hands-free profile, Attribute Protocol and Generic Attribute Profile. In this embodiment, the memory 2 may be an internal memory integrated in the main controller, including an ROM internal memory and an RAM internal memory. The computer program is stored in the ROM internal memory, and the temporary voice data is stored in the RAM internal memory. The main controller 3 is configured to execute the computer program. The baseband circuit 1 is electrically connected to the main controller 3, and the memory 2 is electrically connected to the main controller 3. In some alternative embodiments, the first Bluetooth headset may also include an NFC chip, and the NFC chip is electrically connected to the main controller 3 for quick connection of the first Bluetooth headset to other Bluetooth devices. An external memory electrically connected to the main controller 3 may also be added to the first Bluetooth headset for storing the generated voice data such that the first Bluetooth headset has a voice recording function.

Although the above contents are detailed descriptions of the present application made in conjunction with specific/exemplary implementations, and it should not be considered that the specific implementations of the present application are limited to these descriptions. It should be understood by persons of ordinary skill in the art that various replacements or variations may be made to the described implementations without departing from the spirit of the present application. All such replacements or variations shall fall within the protection scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for identifying a Bluetooth headset voice source, comprising the following steps:
    S1: establishing a connection between a device itself, that is, a first Bluetooth headset, and a smart terminal and a connection between the first Bluetooth headset and a second Bluetooth headset separately; and
    S2: when the first or second Bluetooth headset sends a voice, establishing a data control channel by using Generic Attribute Profile and Attribute Protocol, sending a corresponding identifier to the smart terminal according to different voice sources, and then sending the voice to the smart terminal.

2. The method according to claim 1, wherein the step S2 further comprises the following substeps:
    S21: generating a first voice by the device itself, or receiving a second voice sent by the second Bluetooth headset;
    S22: determining whether the voice is generated by the device itself; if not, executing S23; if yes, sending a first identifier representing the first Bluetooth headset to the smart terminal, then sending the first voice to the smart terminal, and ending; and
    S23: sending a second identifier representing the second Bluetooth headset to the smart terminal, and then sending the second voice to the smart terminal.

3. The method according to claim 2, wherein when the first or second Bluetooth headset receives a voice from the smart terminal, the method further comprises the following steps:
    S3: enabling the device itself, that is, the first Bluetooth headset, to receive an identifier sent by the smart terminal by using the data control channel, and then receive the voice sent by the smart terminal;
    S4: determining whether the identifier is the first identifier representing the first Bluetooth headset; if not, executing S5; if yes, playing the voice directly; and
    S5: sending the voice to the second Bluetooth headset.

4. The method according to claim 1, wherein the identifier is UUID data.

5. The method according to claim 1, wherein an audio transport protocol between the smart terminal, the first Bluetooth headset and the second Bluetooth headset is Hands-Free Profile.

6. The method according to claim 1, wherein the smart terminal is a mobile smart device with a Bluetooth interface, and can be a smart phone, a tablet computer, and a smart watch or bracelet.

7. A device for identifying a Bluetooth headset voice source, comprising a baseband circuit, a memory, and a main controller, wherein the memory is configured to store a computer program and temporary voice data, the main controller is configured to execute the computer program, the baseband circuit is electrically connected to the main controller, and the memory is electrically connected to the main controller, wherein the computer program enables the device to perform the method according to claim 1.

8. The device for identifying a Bluetooth headset voice source according to claim 7, wherein the memory is an internal memory integrated in the main controller.

9. The device for identifying a Bluetooth headset voice source according to claim 7, wherein the first Bluetooth headset further comprises an NFC chip, and the NFC chip is electrically connected to the main controller for quick connection of the device itself, that is, the first Bluetooth headset to the smart terminal and the second Bluetooth headset.

10. A computer readable storage medium comprising a computer program, wherein the computer program is operable to enable a computer to perform the method according to claim 1.

* * * * *